United States Patent
Bivens et al.

(10) Patent No.: US 9,637,233 B2
(45) Date of Patent: May 2, 2017

(54) UNMANNED AERIAL VEHICLE FOR INTERACTING WITH A PET

(71) Applicant: INTERNATIONAL BUSINESS MACHINES CORPORATION, Armonk, NY (US)

(72) Inventors: John A. Bivens, Ossining, NY (US); Minkyong Kim, Scarsdale, NY (US); Min Li, San Jose, CA (US); Clifford A. Pickover, Yorktown Heights, NY (US); Valentina Salapura, Chappaqua, NY (US)

(73) Assignee: International Business Machines Corporation, Armonk, NY (US)

( * ) Notice: Subject to any disclaimer, the term of this patent is extended or adjusted under 35 U.S.C. 154(b) by 67 days.

(21) Appl. No.: 14/860,003

(22) Filed: Sep. 21, 2015

(65) Prior Publication Data
US 2017/0081027 A1    Mar. 23, 2017

(51) Int. Cl.
*B64C 39/02*    (2006.01)
*A01K 15/00*    (2006.01)
*G05D 1/00*    (2006.01)

(52) U.S. Cl.
CPC ............ *B64C 39/024* (2013.01); *A01K 15/00* (2013.01); *G05D 1/0088* (2013.01); *B64C 2201/12* (2013.01)

(58) Field of Classification Search
CPC .............................. B64C 39/024; A01K 15/00
See application file for complete search history.

(56) References Cited

U.S. PATENT DOCUMENTS

| 4,840,143 | A  | 6/1989 | Simon |
| 6,135,056 | A  | 10/2000 | Kuo |
| 8,483,873 | B2 | 7/2013 | Wong et al. |
| 8,800,488 | B2* | 8/2014 | Stone ............... A01K 5/0114 119/51.01 |

(Continued)

FOREIGN PATENT DOCUMENTS

| CN | 203152217 U | 8/2013 |
| EP | 1941411 B2 | 9/2011 |

(Continued)

OTHER PUBLICATIONS

Hong, K., "This company shows how the Internet of everything will make a difference to your dogs and cats," TheNextWeb, Jan. 14, 2014. (pp. 1-8). Available at: http://thenextweb.com/gadgets/2014/01/24/thiscompanyshowshowtheinternetofeverythingwillmakeadifferencetoyourdogsandcats/.

(Continued)

*Primary Examiner* — Basil T Jos
(74) *Attorney, Agent, or Firm* — Tutunjian & Bitetto, P.C.; Alexa Ashworth

(57) ABSTRACT

An unmanned aerial vehicle for interacting with a pet. The unmanned aerial vehicle includes a processor-based monitoring device to provide a behavioral assessment of the pet, an activity recommender to select an activity program dependent on the behavioral assessment, a motor mounted on the unmanned aerial vehicle to provide aerial movement based on the activity program, and an activity coordinator to perform a function based on the activity program. The function includes activating feedback outputs upon completion of the activity program.

20 Claims, 4 Drawing Sheets

(56) References Cited

U.S. PATENT DOCUMENTS

2009/0055019 A1    2/2009  Stiehl et al.
2010/0122662 A1    5/2010  Kennington

FOREIGN PATENT DOCUMENTS

WO    WO2015022608 A1    2/2015
WO    WO2015062165 A1    5/2015

OTHER PUBLICATIONS

Kogan Australia Pty Ltd, "Pawever Automatic Pet Feeder," Kogan. com. Sep. 2015. (1 Page). Available at : https://www.kogan.com/au/buy/pawever-automatic-pet-feeder/.

* cited by examiner

UNMANNED AERIAL VEHICLE FOR INTERACTING WITH A PET

BACKGROUND

Technical Field

The present invention relates generally to an unmanned aerial vehicle and, in particular, to an unmanned aerial vehicle for interacting with a pet.

Description of the Related Art

Despite the products and services available to consumers, pet obesity and pet disobedience remain a common problem associated with pet ownership, especially when a pet is left alone without the supervision of their owner for extended amounts of time. One common problem when pets are left alone is that pets may become disruptive and/or destructive. These problems may become amplified when the pet experiences distress when owners prepare to leave the house, which is commonly referred to as separation anxiety.

SUMMARY

According to an aspect of the present principles, an unmanned aerial vehicle for interacting with a pet is provided. The unmanned aerial vehicle includes a processor-based monitoring device to provide a behavioral assessment of the pet, an activity recommender to select at least one activity program dependent on the behavioral assessment, at least one motor mounted on the unmanned aerial vehicle to provide aerial movement based on the at least one activity program, and an activity coordinator to perform at least one function based on the at least one activity program, wherein the at least one function includes activating at least one of a plurality of feedback outputs upon completion of the activity program.

According to another aspect of the present principles, a method for interacting with a pet using an unmanned aerial vehicle is provided. The method includes monitoring, by a processor-based monitoring device, the pet to provide a behavioral assessment of the pet, selecting at least one activity program dependent on the behavioral assessment, aerially moving the unmanned aerial vehicle system based on the at least one activity program, and performing at least one function based on the at least one activity program, wherein the at least one function includes activating at least one of a plurality of feedback outputs upon completion of the activity program.

According to another aspect of the present principles, a non-transitory computer readable storage medium for interacting with a pet using an unmanned aerial vehicle is provided. The non-transitory computer readable storage medium includes a computer readable program for interacting with a pet using an unmanned aerial vehicle, wherein the computer readable program, when executed on a computer, causes the computer to execute monitoring, by a processor-based monitoring device, the pet to provide a behavioral assessment of the pet, selecting at least one activity program dependent on the behavioral assessment, controlling, using control signals, aerial movement of an unmanned aerial vehicle based on the at least one activity program, and performing at least one function based on the at least one activity program, wherein the at least one function includes activating at least one of a plurality of feedback outputs upon completion of the activity program.

These and other features and advantages will become apparent from the following detailed description of illustrative embodiments thereof, which is to be read in connection with the accompanying drawings.

BRIEF DESCRIPTION OF DRAWINGS

The disclosure will provide details in the following description of preferred embodiments with reference to the following figures wherein.

DETAILED DESCRIPTION OF PREFERRED EMBODIMENTS

Figure 1:
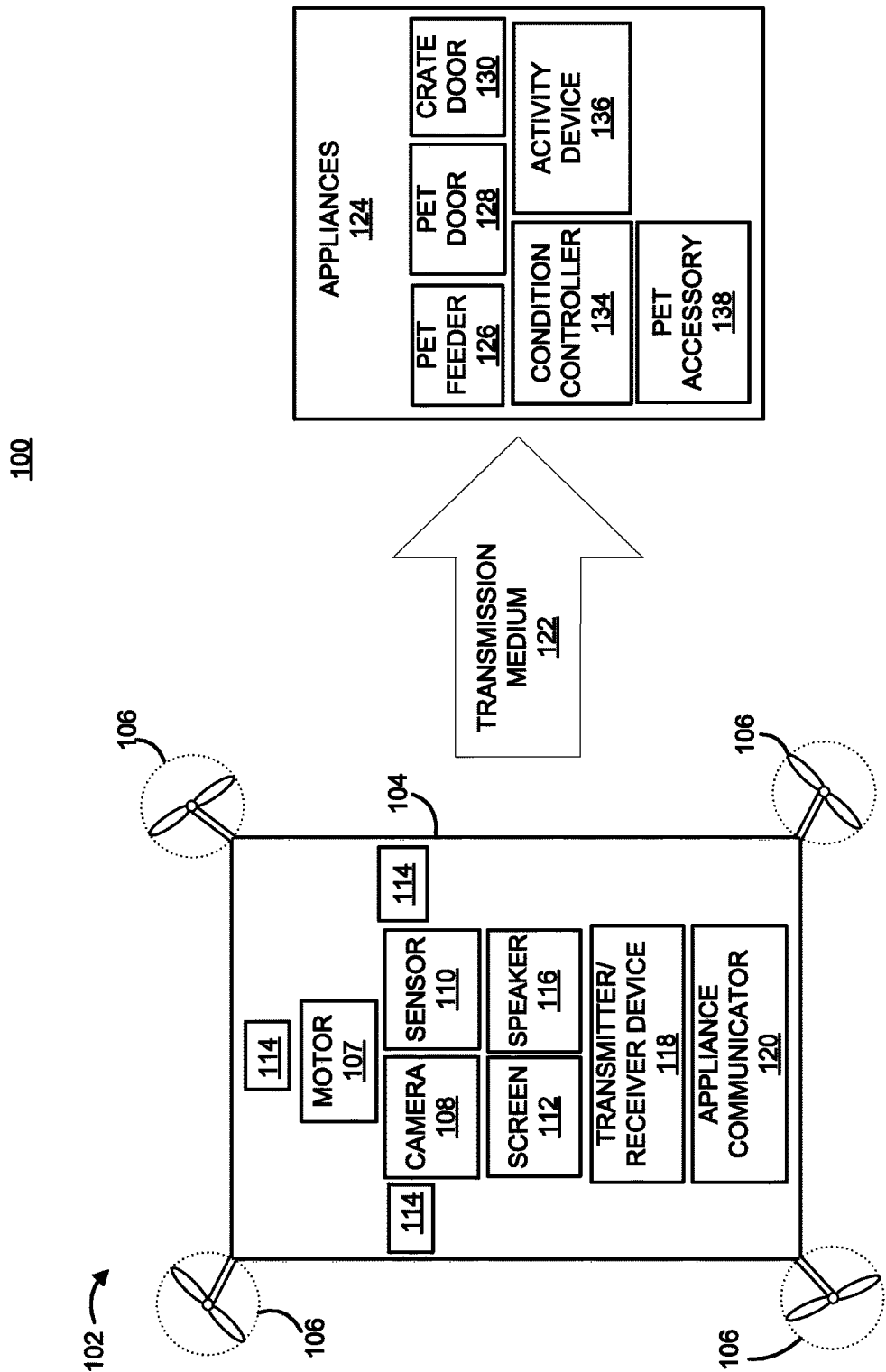
FIG. 1 shows an exemplary system for interacting with a pet using an unmanned aerial vehicle, in accordance with an embodiment of the present principles.

The present principles are directed to an unmanned aerial vehicle for interacting with a pet. Advantageously, the present principles provide a system, method, and computer program product to monitor, interact, train, and provide feedback to the pet to minimize distress, reduce obesity, and discourage disobedience. The system, method and computer program product described herein may perform a function and/or provide feedback, based on a selected activity program, from a plurality of feedback outputs. Feedback may be in the form of rewards, commands, tones, etc. that may include food related and non-food related items. The system, method and computer program product described herein may minimize pet obesity by adjusting a food-related reward dispensed and provide a reward having low-caloric content. In addition, the system, method and computer program product provided herein may enable the unmanned aerial vehicle to interact with a pet by communicating with various components and/or pet appliances in a smart home, such as a pet door, pet feeder, etc. In addition, the system, method, and computer program product provided herein may also engage in exercises and/or activities with the pet, such as fetch.

It is to be understood that the words "reward" and "pet" are used loosely and are not intended to suggest any limitation as to the scope of use or functionality of embodiments of the present principles described herein. For example, "reward" may refer to, but is not limited to, food related items, such as treats in the form of biscuits, commonly used with pet training and/or rewarding for good behavior, or to non-food related actions, such as vocalized praise, warning, etc. Generally, the word "reward" refers to various aspects of keeping a pet happy, healthy, and with good cognitive tone. In addition, the word "pet" may be used as referring to a dog, cat, or any other domesticated animal and is not intended to limit the scope of the present principles.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Reference in the specification to "one embodiment" or "an embodiment" of the present principles, as well as other variations thereof, means that a particular feature, structure, characteristic, and so forth described in connection with the embodiment is included in at least one embodiment of the present principles. Thus, the appearances of the phrase "in one embodiment" or "in an embodiment", as well any other variations, appearing in various places throughout the specification are not necessarily all referring to the same embodiment.

It is to be appreciated that the use of any of the following "/", "and/or", and "at least one of", for example, in the cases of "A/B", "A and/or B" and "at least one of A and B", is intended to encompass the selection of the first listed option (A) only, or the selection of the second listed option (B)

only, or the selection of both options (A and B). As a further example, in the cases of "A, B, and/or C" and "at least one of A, B, and C", such phrasing is intended to encompass the selection of the first listed option (A) only, or the selection of the second listed option (B) only, or the selection of the third listed option (C) only, or the selection of the first and the second listed options (A and B) only, or the selection of the first and third listed options (A and C) only, or the selection of the second and third listed options (B and C) only, or the selection of all three options (A and B and C). This may be extended, as readily apparent by one of ordinary skill in this and related arts, for as many items listed.

Referring to the drawings in which like numerals represent the same or similar elements and initially to FIG. 1, an exemplary system 100 for interacting with a pet using an unmanned aerial vehicle 102 is illustratively depicted. It should be understood by one of ordinary skill in the art that the unmanned aerial vehicle 102 may comprise a drone, a drone-like unit, or similarly functioning devices. The unmanned aerial vehicle 102 may include a housing unit 104, at least one movement mechanism 106, a motor 107, and various components including a camera 108, at least one sensor 110, a screen 112, a transmitter/receiver device 118, and a plurality of feedback outputs. The plurality of feedback outputs may include a plurality of reward compartments 114, a speaker 116, and an appliance communicator 120. It should be understood that the various components of the unmanned aerial vehicle 102 may be affixed on the outside of the housing unit 104 or, alternatively, may be enclosed within the housing unit 104 of the unmanned aerial vehicle 102. The unmanned aerial vehicle 102 may also include other elements (not shown) or may omit some elements as shown, as readily contemplated by one of skill in the art.

The unmanned aerial vehicle 102 may include at least one movement mechanism 106. It should be understood that the at least one movement mechanism 106 may include a single propeller, a plurality of propellers, a propulsion mechanism, or similarly functioning devices. In one embodiment, the at least one movement mechanism may be powered by at least one motor 107 and a power supply (not shown) to provide movement for the unmanned aerial vehicle. For example, the motor 107 may be mounted on the unmanned aerial vehicle 102 to provide aerial movement (e.g., flying movement) based on the at least one activity program, which will be described in further detail below.

The movement mechanism(s) 106 may be placed at any desired location on the unmanned aerial vehicle 102 such that the placement of the movement mechanism(s) 106 does not interfere with each other or with another component positioned on the unmanned aerial vehicle 102. In one embodiment, the at least one movement mechanism 106 may be positioned on at least one extension arm (not shown) such that the at least one extension arm connects the at least one movement mechanism 106 to the housing unit 104.

Figure 3:
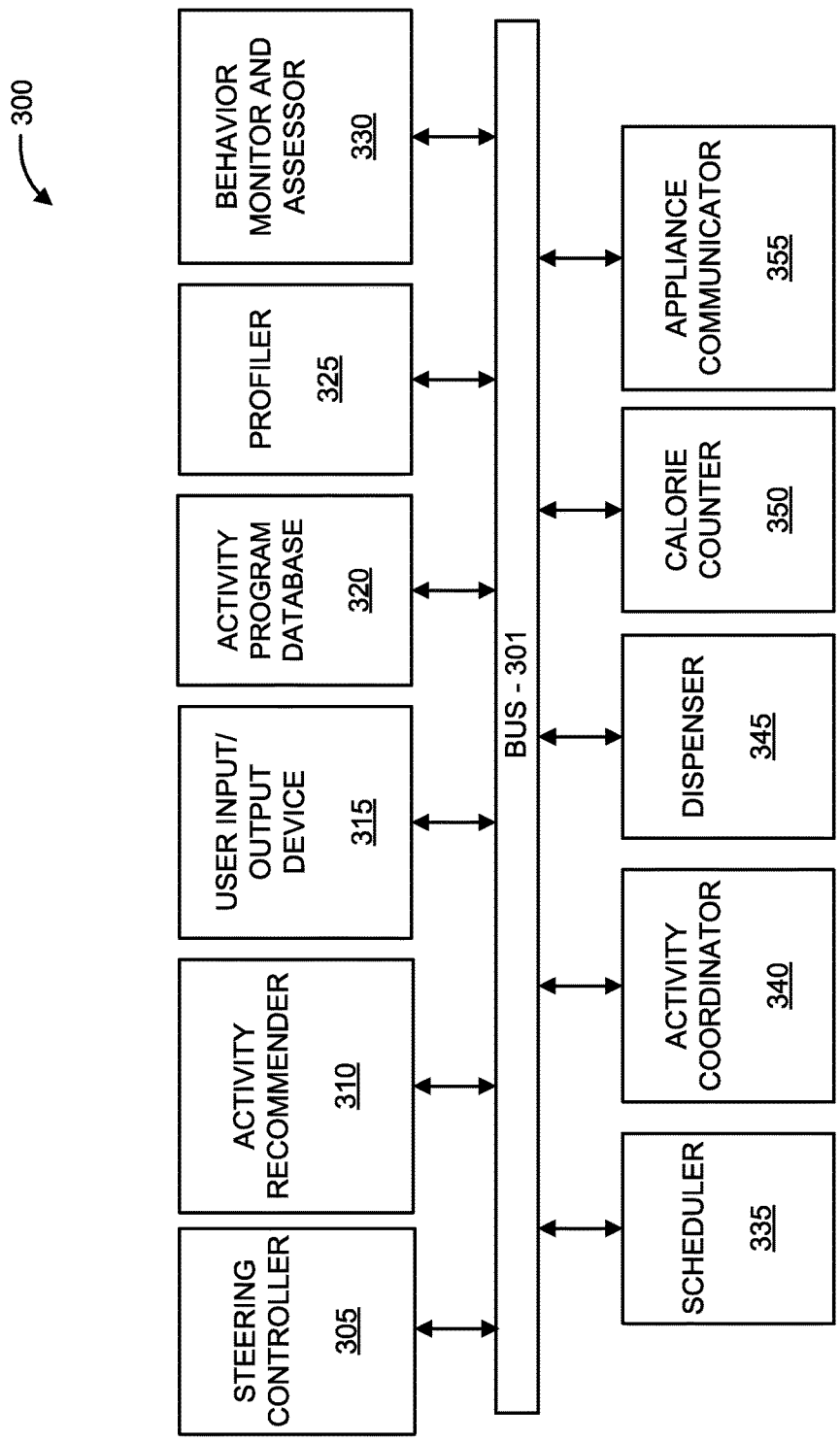
FIG. 3 shows an exemplary system for interacting with a pet using an unmanned aerial vehicle, in accordance with an embodiment of the present principles.

In one embodiment, the movement mechanism 106 and/or motor 107 provides aerial movement for the unmanned aerial vehicle 102 in multiple degrees of freedom. Multiple degrees of freedom generally refers to the ability for the unmanned aerial vehicle 102 to move in a three-dimensional space. Specifically, the movement mechanism 106 and/or motor 107 may be controlled by a steering controller 305, as illustrated in FIG. 3, to move the unmanned aerial vehicle 102 along three perpendicular axes, namely forward/backward movement, up/down movement, and left/right movement. In addition, the steering controller 305 may control the movement of the unmanned aerial vehicle in 360 degree rotation, tilting forward/backward movement (e.g., pitching), swiveling left/right movement (e.g., yawing), and pivoting side to side movement (e.g., rolling). In one embodiment, the movement mechanism(s) 106 and/or motor 107 provides movement for the unmanned aerial vehicle 102 to, for example, move the unmanned aerial vehicle 102 out of range of the pet and/or over difficult terrain and/or obstacles (e.g., carpets, stairs, branches, etc.).

The unmanned aerial vehicle 102 may include a camera 108. The camera 108 may be configured to provide visual feedback to the unmanned aerial vehicle 102, such as still images and/or video feedback. For example, the camera 108 may be configured to detect moving objects (e.g., movement of a pet), stationary objects (e.g., furniture, household structures), lighting conditions, expressions of a pet, etc. In one embodiment, the camera 108 may be configured to provide visual feedback of expressions made by a pet and/or body movements of the pet (e.g., circling, panting, scratching of a door, etc.). For example, the camera 108 may be configured to provide still images, such as a sequence of still images, and/or video feedback of a pet exhibiting one or more movements. In another embodiment, the camera 108 may be configured to provide visual feedback of obstacles in the path of the unmanned aerial vehicle 102 for any purpose such as, but not limited to, navigation guidance to the unmanned aerial vehicle 102. It should be understood that various types of cameras, including night-vision enabled cameras, infrared sensing cameras, etc., are within the scope of the present principles.

In an embodiment, the unmanned aerial vehicle 102 may include at least one sensor 110. The sensor 110 may include, but is not limited to, an acoustic sensor (e.g., microphone), a chemical sensor, an infrared sensor, an optical sensor, a collision avoidance sensor (e.g., a proximity sensor), a temperature sensor, etc. In an embodiment, the sensor 110 may be configured to detect sounds made by a pet, such as whimpering, barking, etc. In a further embodiment, the sensor 110 may be configured to detect proximity to objects and/or obstacles in the path of the unmanned aerial vehicle 102 for any purpose such as, but not limited to, navigation guidance to the unmanned aerial vehicle 102. In yet a further embodiment, the sensor 110 may be configured to detect the temperature in an area in close proximity to the unmanned aerial vehicle 102 and/or the pet (e.g., temperature in the household, temperature of the pet, etc.).

The unmanned aerial vehicle 102 may include plurality of feedback outputs including a plurality of reward compartments 114. In an embodiment, the plurality of reward compartments 114 may be configured to provide feedback for the unmanned aerial vehicle 102. For example, feedback of the plurality of reward compartments 114 may include dispensing a food-related reward, such as a treat. The plurality of reward compartments 114 may be assembled as fixed compartments or compartments that are enclosed in a rotating carousel within the housing unit 104. The plurality of reward compartments 114 may include a door (not shown) for purposes of dispensing a reward. It should be understood that various types of doors, including trap doors, mechanical doors, electrical doors, etc., are within the scope of the present principles. In an embodiment, each one of the plurality of reward compartments 114 may include a pet treat with a prescribed caloric content. For example, one compartment may include low-calorie treats and another compartment may include high-calorie treats.

The unmanned aerial vehicle 102 may include a screen 112 and a transmitter/receiver device 118. The screen 112 may be configured to display video feedback. The transmitter/receiver device 118 may be configured to provide audio and/or video feedback information to/from the unmanned aerial vehicle 102 and a user device (not shown). The user device may include a mobile device (e.g., a smart phone, tablet, computing device, and so forth) or any other system(s) that can be used by the particular user. In an embodiment, the screen 112 may be configured to display video feedback provided by the user to the unmanned aerial vehicle 102 via the transmitter/receiver device 118.

For example, the user may transmit a video message to the unmanned aerial vehicle 102 and the transmitter/receiver device 118 may receive the video message. The transmitter/receiver device 118 may then provide the video feedback to the pet by displaying the video message on screen 112. In another example, the transmitter/receiver device 118 may transmit video feedback, such as still images and/or video of the pet, to the user. Similarly, the transmitter/receiver device 118 may transmit audio feedback of the pet (e.g., barking, whimpering, etc.) to the user, the audio feedback being provided by sensor 110. In yet another example, the transmitter/receiver device 118 may receive audio feedback from the user and transmit the audio feedback to the pet using speaker 116, which will now be described.

In an embodiment, the unmanned aerial vehicle 102 may include a speaker 116. The speaker 116 may be configured to provide behavior reinforcement to the pet for the unmanned aerial vehicle 102. For example, the speaker 116 may be configured to provide behavior reinforcement in the form of audio feedback (e.g., a command, tone, whistle, a warning, etc.) to a pet. It should be understood that various types of speakers, including loudspeakers, transducers, and any other device capable of converting an electrical audio signal into a corresponding sound, are within the scope of the present principles.

In an embodiment, the unmanned aerial vehicle 102 may include an appliance communicator 120. The appliance communicator 120 may be configured to provide feedback for the unmanned aerial vehicle 102. The appliance communicator 120 may be configured to communicate with one or more appliances 124 in a smart home to interact with the pet. It should be understood that a smart home includes a home equipped various devices, including lighting, heating, electronic devices, etc., that can be controlled remotely, such as by phone or computer.

Appliances 124 in a smart home may include, but are not limited to, a pet feeder 126, a pet door 128, a crate door 130, a condition controller 132 (e.g., temperature controller, lighting controller, etc.), an activity device 134 (e.g., a ball thrower), and a pet accessory 136 (e.g., a pet collar). In other embodiments, the appliances 124 in a smart home may include a relief station device, such as a litter box or similarly functioning devices. It is to be appreciated that the various appliances described herein are merely illustrative and, thus, the present principles can be used with other appliances while maintaining the scope of the present principles.

The appliance communicator 120 of the unmanned aerial vehicle 102 may be configured to send a request by a transmission medium 122 to the appliance(s) 124 to perform a function, such function being performed by the pet appliance. In an embodiment, the appliance communicator 120 may be configured to communicate with the pet feeder 126 to dispense dietary needs, such as food, water, dietary supplements, etc. to the pet. In an embodiment, the appliance communicator 120 may be configured to communicate with the pet door 128 and/or crate door 130 to either open or close the pet door 128 or crate door 130, as needed, to allow the pet to go out. In another embodiment, the appliance communicator 120 may be configured to communicate with a condition controller 132, such as lighting and/or temperature controls, to turn lights in the household on/off or dim the lights or to adjust the temperature conditions of the household, respectively. In a further embodiment, the appliance communicator 120 may be configured to communicate with an activity device 134 to engage in activities with the pet. In yet a further embodiment, the appliance communicator 120 may be configured to communicate with a pet accessory 136. These and other features of the unmanned aerial vehicle 102 will be described in further detail below.

Figure 2:
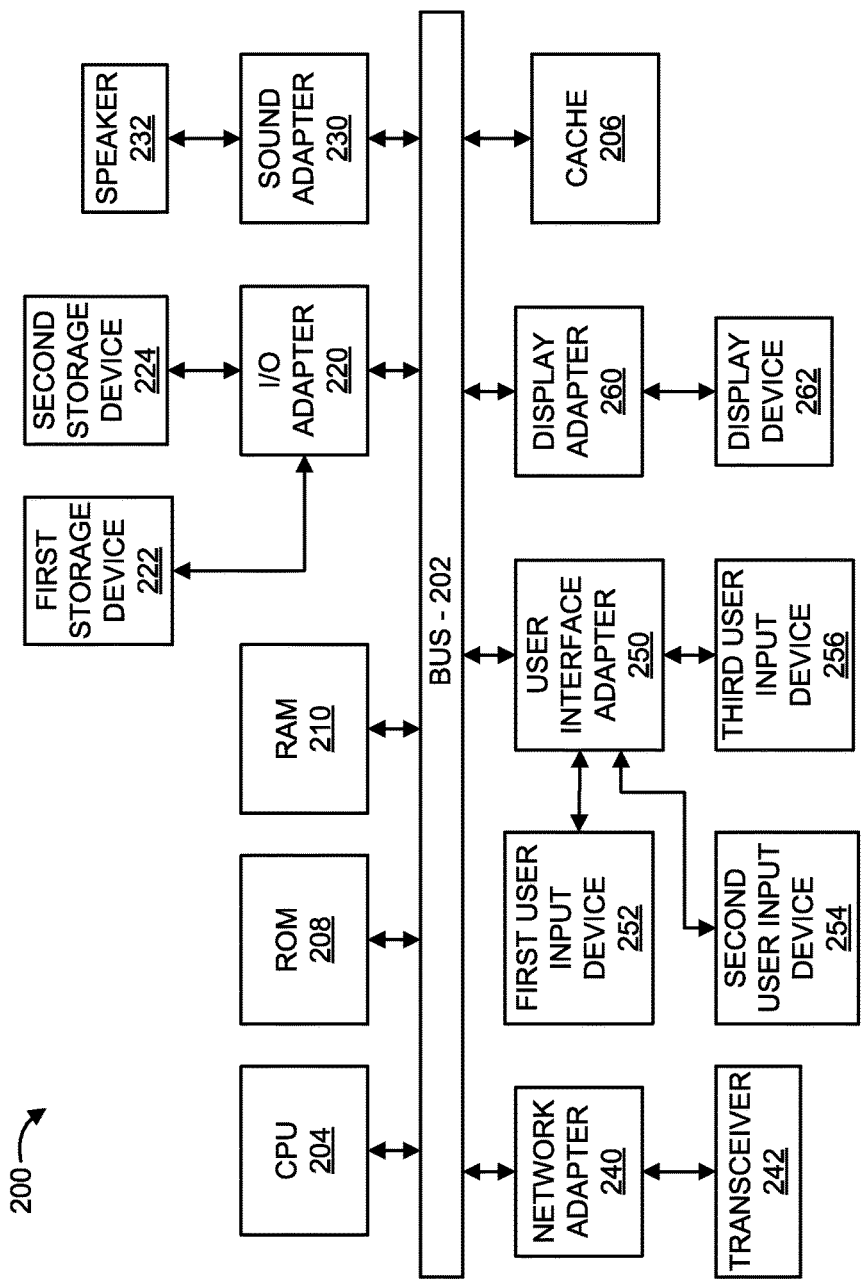
FIG. 2 shows an exemplary processing system for interacting with a pet using an unmanned aerial vehicle, in accordance with an embodiment of the present principles.

Moreover, it is to be appreciated that system 200 described below with respect to FIG. 2 is a system for implementing respective embodiments of the present principles. Part or all of processing system 100 may be implemented in one or more of the elements of system 200. Further, it is to be appreciated that processing system 100 may perform at least part of the method described herein including, for example, at least part of method 400 of FIG. 4.

Now referring to FIG. 2, with continued reference to FIG. 1, an exemplary processing system 200 to which the present principles may be applied, in accordance with an embodiment, is illustratively depicted. The processing system 200 includes at least one processor, such as a computer processing unit (CPU) 204, operatively coupled to other components via a system bus 202. A cache 206, a Read Only Memory (ROM) 208, a Random Access Memory (RAM) 210, an input/output (I/O) adapter 220, a sound adapter 230, a network adapter 240, a user interface adapter 250, and a display adapter 260 are operatively coupled to the system bus 202.

A first storage device 222 and a second storage device 224 are operatively coupled to system bus 202 by the I/O adapter 220. The storage devices 222 and 224 can be any of a disk storage device (e.g., a magnetic or optical disk storage device), a solid state magnetic device, etc. The storage devices 222 and 224 can be the same type of storage device or different types of storage devices. In one embodiment, activity programs for interacting with a pet and/or profiles of a pet may be stored on the first storage device 222 and/or the second storage device 224.

A speaker 232 is operatively coupled to system bus 202 by the sound adapter 130. In one embodiment, the unmanned aerial vehicle 102 may be configured to direct behavior reinforcement of the pet using feedback, such as providing a vocalized warning, a vocalized praise, a command, a tone (e.g., beep, whistle, etc.), or the owner's voice to the pet through speaker 232 and/or speaker 116 of FIG. 1.

A transceiver 242 is operatively coupled to system bus 202 by network adapter 240. A display device 262 is operatively coupled to system bus 202 by display adapter 260. For example, the display device 262 may be configured to display video feedback provided by the transceiver 242 on the screen 112 of FIG. 1.

A first user input device 252, a second user input device 254, and a third user input device 256 are operatively coupled to system bus 202 by user interface adapter 250. The user input devices 252, 254, and 256 can be any of a keyboard, a mouse, a keypad, an image capture device, a motion sensing device, a microphone, a device incorporating the functionality of at least two of the preceding devices, and so forth. Other types of input devices can also be used, while maintaining the spirit of the present principles. The user input devices 252, 254, and 256 can be the same type of user input device or different types of user input devices. The user input devices 252, 254, and 256 are used to input and output information to and from system 200.

The processing system 200 may also include other elements (not shown) or may omit some elements as shown, as readily contemplated by one of skill in the art. For example, various other input devices and/or output devices can be included in processing system 200, depending upon the particular implementation of the same, as readily understood by one of ordinary skill in the art. For example, various types of wireless and/or wired input and/or output devices can be used. Moreover, additional processors, controllers, memories, and so forth, in various configurations can also be utilized as readily appreciated by one of ordinary skill in the art. These and other variations of the processing system 100 are readily contemplated by one of ordinary skill in the art given the teachings of the present principles provided herein.

Moreover, it is to be appreciated that system 300 described below with respect to FIG. 3 is a system for implementing respective embodiments of the present principles. Part or all of processing system 200 may be implemented in one or more of the elements of system 300.

Figure 4:
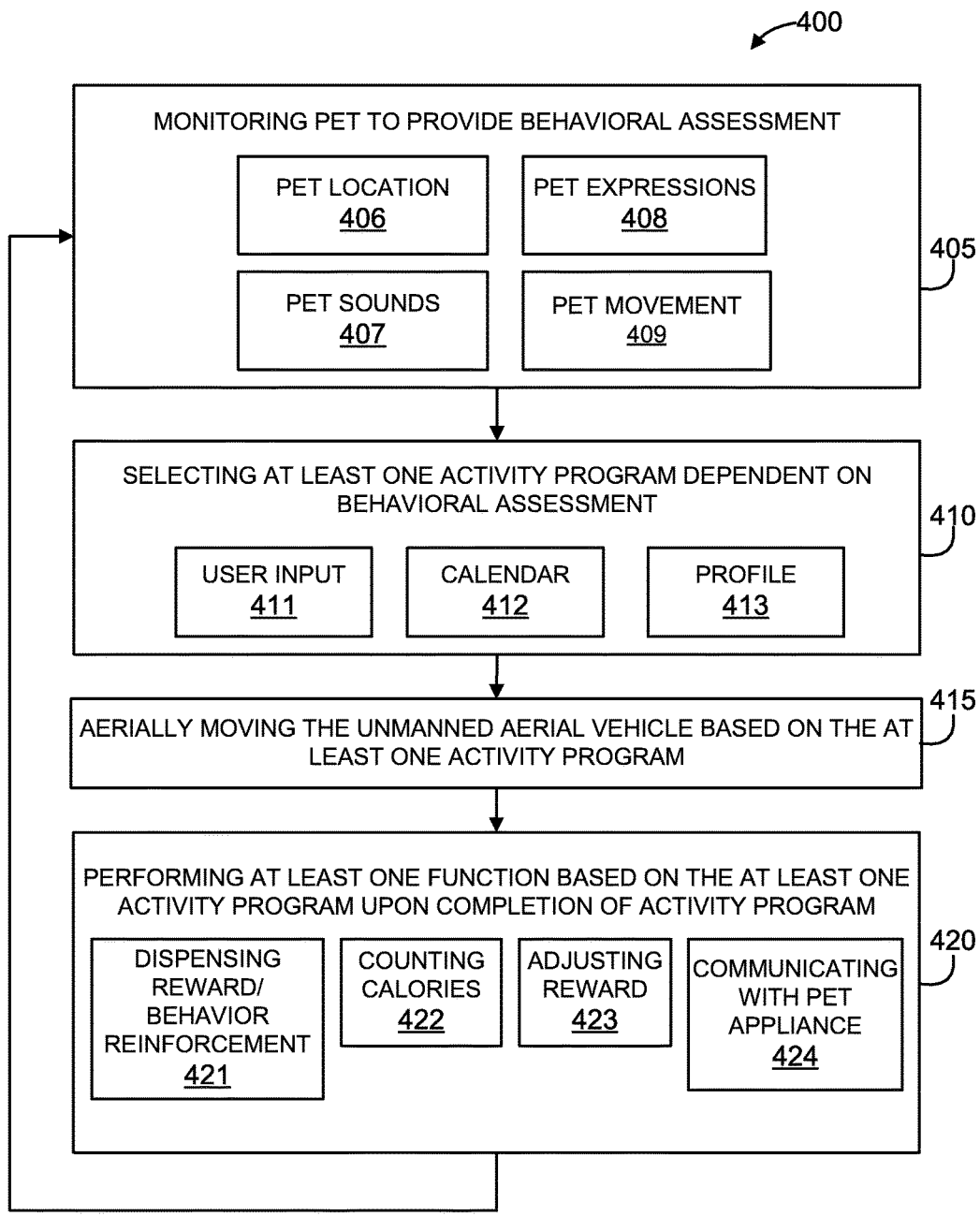
FIG. 4 shows an exemplary method for interacting with a pet using an unmanned aerial vehicle, in accordance with an embodiment of the present principles.

Further, it is to be appreciated that processing system 200 may perform at least part of the method described herein including, for example, at least part of method 400 of FIG. 4. Similarly, part or all of system 300 may be used to perform at least part of method 400 of FIG. 4.

Referring now to FIG. 3, with continued reference to FIG. 1 and FIG. 2, an exemplary system 300 for an advanced unmanned aerial vehicle 102 for interacting with a pet is shown, in accordance with an embodiment of the present principles. The system 300 includes a steering controller 305, an activity recommender 310, a user input/output device 315, an activity program database 320, a profiler 325, a behavior monitor and assessor 330, a scheduler 335, an activity coordinator 340, a dispenser 345, a calorie counter 350, and an appliance communicator 355.

The steering controller 305 may be configured to control movement of the unmanned aerial vehicle 102. In one embodiment, the steering controller 305 may control the aerial movement of the unmanned aerial vehicle 102 by controlling the at least one movement mechanism 106 and/or motor 107 illustrated in FIG. 1. For example, the steering controller 305 may control aerial movement of the unmanned aerial vehicle 102 by sending control signals to the at least one movement mechanism 106 and/or motor 107. In another embodiment, the steering controller 305 may control the aerial movement of the unmanned aerial vehicle 102 based on at least one activity program. For example, the steering controller 305 may provide aerial movement to the unmanned aerial vehicle 102 to perform the at least one activity program. In an embodiment, the steering controller 305 may control the unmanned aerial vehicle 102 to move the unmanned aerial vehicle 102 in multiple degrees of freedom. Specifically, the steering controller 305 may be configured to control the movement of the unmanned aerial vehicle 102 in a forward/backward movement, up/down movement, left/right movement, rotational movement, tilting forward/backward movement (e.g., pitching), swiveling left/right movement (e.g., yawing), and pivoting side to side movement (e.g., rolling).

In an embodiment, the steering controller 305 may be configured to control movement of the unmanned aerial vehicle 102 controlling the rotational speed(s) and/or rotational direction(s) of each of the movement mechanisms 106 independently. For example, the steering controller 305 may be configured to rotate each of the movement mechanisms 106 in a single direction or, alternatively, the steering controller 305 may be configured to rotate each of the movement mechanisms 106 in opposing directions. In one embodiment, the steering controller 305 may be configured to control movement of the unmanned aerial vehicle 102 to move the unmanned aerial vehicle 102 out of range of the pet and/or to move the unmanned aerial vehicle 102 over difficult terrain and/or obstacles (e.g., carpets, stairs, branches, etc.).

The activity recommender 310 is configured to select an activity program from a plurality of activity programs. For example, the plurality of activity programs may include, but are not limited to, training commands (e.g., sit, stay, lie down, etc.), training obedience (e.g., reduction/minimization of barking, howling, whining, growling, meowing, chewing of household items, inappropriate actions, such as incorrect bathroom usage, etc.), and exercise activities (e.g., running, playing fetch, etc.). In one embodiment, the activity recommender 310 may select an activity program based on at least one of a user input/output device 315, an activity program database 320, a profiler 325, a behavior monitor and assessor 330, and a scheduler 335 to select a dynamic activity program.

In FIG. 3, with continued referenced to FIG. 1 and FIG. 2, the user input/output device 315 may be configured to input and output information from a user to system 100, system 200 and/or system 300, in accordance with one embodiment. For example, user input/output device 315 may be configured to output video and/or audio information provided by the user to the pet through the screen 112 of system 100, display device 262 of system 200, speaker 116 of system 100, and/or speaker 232 of system 200.

In another embodiment, user input/output device 315 may be further configured to output information from system 100, system 200 and/or system 300 to a user. For example, one or more of the following can be made available to a user: audio/video content of the pet, behavior content of the pet (e.g., a pet alert), activity programs, etc. Such content can be provided or accessed using a mobile device (e.g., a smart phone, tablet, computing device, and so forth) of the particular user or any other system(s) that can be used by the particular user. In one embodiment, user input/output device 315 may be further configured to communicate with the activity recommender 310 to select an activity program from the activity program database 320. User input/output device 315 may include various input devices and/or output devices, depending upon the particular implementation of the same, as readily understood by one of ordinary skill in the art. For example, various types of wireless and/or wired input and/or output devices can be used. It is to be understood that the user input/output device 315 may be configured to input/output information supplied by more than one user.

In one embodiment, the activity recommender 310 may be configured to retrieve activity programs from an activity program database 320. The activity program database 320 may be configured to store a plurality of training programs. For example, the training programs may include, but are not limited to, programs with one or more objectives (e.g., commands, obedience, exercise, etc.). In a further embodiment, the activity program database 320 may be configured to record a history of previous activity programs used for each pet.

In another embodiment, the activity recommender 310 may be configured to select an activity program dependent on a profiler 325. The profiler 325 may be configured to store information regarding a profile of the pet. For example, the profile of the pet may include, but is not limited to, information regarding the pet breed, pet type, pet's capacity and/or propensity to cause damage or to self-injure itself, etc. In a further embodiment, the profiler 325 may be configured to update information regarding the profile of the pet based the behavioral assessment. For example, if the pet is prone to engaging in destructive behavior, the profile of the pet may be undated to include the pet's propensity to be destructive.

In one embodiment, the activity recommender 310 may be configured to select an activity program dependent on a behavior monitor and assessor 330. The behavior monitor and assessor 330 may be configured to monitor the pet to provide a behavioral assessment of the pet. In an embodiment, the behavior monitor and assessor 330 may be configured to store images and/or sounds commonly made by pets or made by a particular pet that indicate a pet expression. The images may be in the form of a still image, a sequence of still images, and/or video images (herein collectively referred to as "stored images"). For instance, the stored images of a pet circling may indicate that the pet may need to go out. In one embodiment, a user may be able to pre-define the stored images to indicate a particular pet expression.

In an embodiment, the behavior monitor and assessor 330 may be configured to receive audio and/or video input to monitor the pet via the camera 108, sensor 110, and/or speaker 116,232 of the unmanned aerial vehicle 102. The images may be in the form of a still image, a sequence of still images, and/or video images (herein collectively referred to as "captured images"). The behavior monitor and assessor 330 may monitor the pet by comparing the captured images to the stored images to determine a pet expression. For example, the behavior monitor and assessor 330 may compare captured images obtained by the camera 108 and compare the captured images to the stored images using image matching and/or image comparison techniques. Image matching and/or image comparison techniques may include, for example, image key point detection. For example, the behavior monitor and assessor 330 may detect key points in the captured images and find corresponding key points in the stored images to determine a pet expression. The behavior monitor and assessor 330 may be configured to monitor physical locations of the pet, such as locations where the pet is not allowed (e.g., rooms, household furniture, etc.) and nearness of the pet to safety hazards (e.g., electrical wires, poisonous household plants and/or food items, devices with choking hazards, holiday decorations, medicines, etc.) via the camera 108.

In another embodiment, the behavior monitor and assessor 330 may be configured to monitor and assess the pet's state of mind. For example, the behavior monitor and assessor 330 may be configured to monitor sounds made by the pet (e.g., whimpering, barking, etc.), behavior of the pet (e.g., lethargy, disobedience, etc.), expressions and/or body movements of the pet (e.g., circling, scratching of a door, etc.). In another example, the behavior assessment and assessor 330 may monitor the pet housed in a closed crate to determine whether the pet needs to use the bathroom.

In a further embodiment, the behavior monitor and assessor 330 may be configured to monitor and assess the pet's state of mind before and after an activity program has been completed and/or after a function has been performed. For example, the behavior monitor and assessor 330 may ascertain the pet's initial state of mind, the activity coordinator may perform at least one function, and the behavior monitor and assessor 330 may ascertain the pet's subsequent state of mind. A function may include providing feedback from at least one of a plurality of feedback outputs, such as dispensing a reward, directing a behavior reinforcement, and/or communicating with smart home appliances, as will be described below.

In an embodiment, the behavior monitor and assessor 330 may be configured to monitor compulsive behavior of the pet, such as exaggerations of normal pet behaviors. For example, compulsive behavior may include behaviors that are exhibited for longer than expected periods of time, repeated out of context, and situations in which such behaviors would be considered abnormal (e.g., spinning, tail chasing, fly biting, light chasing, barking, chewing on household items or body parts of the pet, staring into space, etc.). The behavior monitor and assessor 330 may monitor the pet to detect these and other compulsive behaviors.

In yet another embodiment, the behavior monitor and assessor 330 may be configured to assess the pet's behavior and/or location of the pet and send an alert to the pet owner (e.g., user) via the user input/output device 315. Upon receiving the alert, the owner/user may communicate, via the user input/output device 315, with the activity recommender 310 to select an activity program for the pet.

The scheduler 335 may be configured to provide a calendar to the activity recommender to schedule activity programs. In one embodiment, the scheduler 335 may schedule an activity program dependent on an owner leave time (e.g., when the owner is scheduled to leave the pet) and/or an owner return time (e.g., when the owner is scheduled to return to the pet). In another embodiment, the scheduler 335 may be configured to adjust the calendar to account for when the owner is late in his/her return time.

The activity coordinator 340 may be configured to execute the selected activity program. In a further embodiment, the activity coordinator 340 may be configured to, upon completion of the activity program, perform at least one function based on the activity program. A function may include providing feedback from at least one of a plurality of feedback outputs, such as dispensing a reward, directing a behavior reinforcement (e.g., a warning), and/or communicating with smart home appliances. In an embodiment, the activity coordinator 340 may be configured to communicate with a plurality of feedback outputs, including a dispenser 345, a calorie counter 350, and an appliance communicator 355, to perform the at least one function. In addition, the activity coordinator 340 may be configured to communicate with a plurality of feedback outputs, including a speaker 116 of system 100 and/or speaker 232 of system 200, to perform the at least one function.

In an embodiment, the activity coordinator 340 may be configured to, upon completion of the activity program, perform a function, the function including providing behavior reinforcement to the pet. Behavior reinforcement may include, for example, audio feedback. For example, if the behavior monitor and assessor 330 detects the pet chewing on furniture, and the activity coordinator 340 executes and completes a corresponding activity program, the activity coordinator 340 may provide behavior reinforcement to the pet via the speaker 116 of system 100 and/or speaker 232 of system 200. The behavior reinforcement may include a vocalized/audio warning, command, tone, whistle, etc. to deter the pet from chewing on the furniture. In addition, for example, the behavior reinforcement may include a vocalized/audio praise when the pet stops chewing on the furniture.

In one embodiment, the activity coordinator 340 may be configured to store the behavior reinforcement and select the behavior reinforcement based on the selected activity program. The activity coordinator 340 may communicate with the speaker 116 of system 100 and/or speaker 232 of system 200 to perform the function (e.g., providing the behavior reinforcement) based on the activity program.

The dispenser 345 may be configured to dispense a reward to the pet after completion of the selected activity program and/or user input. In an embodiment, the dispenser 345 may dispense a food related reward to the pet through at least one of the plurality of reward compartments 114 of system 100. The dispenser 345 may be configured to operate each of the plurality of reward compartments 114 separately (e.g., by opening/closing each compartment and/or rotating the compartments in a rotating carousel). The dispenser 345 may be configured to operate each of the compartments 114 separately based on feedback from the activity coordinator 340. In an embodiment, the activity coordinator 340 may be configured to, upon completion of the activity program, provide feedback (e.g., food related reward) to a pet from a plurality of feedback outputs (e.g., the plurality of reward compartments 114) by communicating with the dispenser 345 to dispense a reward. In another embodiment, the dispenser 345 may be configured to dispense a reward based on the user input/output device 315. For example, the user may provide a reward to the pet by requesting, via the user input/output device 315, the dispenser 345 to dispense a reward.

The calorie counter 350 may be configured to count calories of the reward(s) dispensed after completion of the activity program and/or user input. For example, the calorie counter 350 may calculate a total amount of calories of the rewards dispended for a given amount of time (e.g., one day, week, month, etc.). In one embodiment, the calorie counter 350 may be configured to select which rewards from the plurality of reward compartments 114 to be selected by the activity coordinator 340 and/or dispenser 345 depending on a target caloric intake parameter (e.g., adjust the reward dispensed). For example, a target calorie intake parameter may represent a maximum amount of calories the pet should consume per day. In addition, the calorie counter 350 may communicate with the activity coordinator 340 to discontinue providing food-related rewards once the target caloric intake has been dispensed from the dispenser 345. Advantageously, the calorie counter 350 of system 300 helps to prevent and/or control obesity in pets.

As illustrated in FIG. 3, with continued reference to FIG. 1, the appliance communicator 355 may be configured to communicate with various pet appliances in a smart home to interact with the pet. In an embodiment, the activity coordinator 340 may be configured to, upon selection of the activity program, communicate with the appliance communicator 355. In one embodiment, for example, the appliance communicator 355 may be configured to communicate with a pet feeder 126 to dispense dietary needs, such as food, water, dietary supplements, etc. For example, the appliance communicator 355 may be configured to communicate with a pet feeder 126 to dispense a predetermined or specific amount of dietary needs. In another embodiment, the appliance communicator 355 may be configured to communicate with the pet feeder 126 to dispense dietary needs based on feedback from the behavior monitor and assessor 330 and/or the user input/output device 315. For example, if the behavior monitor and assessor 330 provides a behavioral assessment indicating that the pet is panting representing symptoms of overheating, the appliance communicator 355 may communicate with the pet feeder 126 to dispense water for the pet.

In another embodiment, the appliance communicator 355 may be configured to communicate with a pet door 128 connected to the outside of a household and/or adjoining rooms to either open or close the pet door, as needed, to allow the pet to leave a particular location. For example, if the behavior monitor and assessor 330 provides a behavioral assessment indicating that the pet is circling representing symptoms of needing to go out, the appliance communicator 355 may communicate with the pet door 128 to open the pet door for the pet to be able to go outside.

In another embodiment, the appliance communicator 355 may be configured to communicate with a crate door 130 to either open or close the crate door, as needed, to allow the pet to leave the crate. It should be understood that a crate is a type of housing unit used to house the pet. For example, if the behavior monitor and assessor 330 provides a behavioral assessment indicating that the pet is circling representing symptoms of needing to go out, the appliance communicator 355 may communicate with the crate door 130 to open the crate door for the pet to be able to leave the crate.

In another embodiment, the appliance communicator 355 may be configured to communicate with a condition controller 132, such as lighting and/or temperature controls of the household. For example, the appliance communicator 355 may be configured to communicate with the lighting controls of the household to turn lights in the household on/off or dim the lights depending on the time of day/night and/or owner leave/return time. In another example, the appliance communicator 355 may be configured to communicate with the temperature controls of the household to adjust the temperature conditions of the household. For example, the appliance communicator 355 may be configured to communicate with the temperature controls to monitor the current temperature and adjust the temperature to an appropriate temperature. In an embodiment, the appliance communicator 355 may be configured to communicate with lighting and/or temperature controls of the household based on the behavioral assessment provided by the behavior monitor and assessor 330 (e.g., lethargic behavior, panting, shivering, etc.) and/or the user input/output device 315.

In a further embodiment, the appliance communicator 355 may be configured to communicate with an activity device 134 to engage in activities with the pet. For example, an activity device 136 may include, but is not limited to, a ball thrower, a cat toy, an exercise device, etc. The appliance communicator 355 may be configured to communicate with, for example, a ball thrower to engage the pet in exercise. In a further embodiment, the appliance communicator 355 may encourage the pet during the activity with a food related or non-food related reward dispensed via the dispenser 345 and/or speaker 116 of system 100 and/or speaker 232 of system 200. For example, during a game of fetch, the appliance communicator 355 may encourage the pet by providing a verbal praise via the speaker 116 and/or treat via the dispenser 345.

In yet a further embodiment, the appliance communicator 355 may be configured to communicate with a pet accessory 136. A pet accessory 136 may include, but is not limited to, a collar, a training collar, etc. worn by the pet. For example, if the pet engages is disruptive and/or destructive behavior (e.g., barking, howling, chewing, etc.), as determined by the behavior monitor and assessor 330 and/or user input/output device 315, the appliance communicator 355 may be configured to communicate with the pet collar to deter the pet from engaging in the disruptive and/or destructive behavior. It is to be appreciated that the appliances described herein are merely illustrative and, thus, the present principles can be used with other components and/or appliances, while maintaining the scope of the present principles.

In the embodiment shown in FIG. 3, the elements thereof may be interconnected by a bus 301. However, in other embodiments, other types of connections can also be used. Moreover, in an embodiment, at least one of the elements of system 300 is processor-based. Further, while one or more elements may be shown as separate elements, in other embodiments, these elements can be combined as one element. These and other variations of the elements of system 300 are readily determined by one of ordinary skill in the art, given the teachings of the present principles provided herein, while maintaining the spirit of the present principles.

Now referring to FIG. 4, with continued reference to FIGS. 1-3, FIG. 4 shows an exemplary method 400 for interacting with a pet using an unmanned aerial vehicle 102, in accordance with an embodiment of the present principles.

In block 405, monitoring of a pet is performed to provide a behavioral assessment. In an embodiment, monitoring of the pet may include receiving audio and/or video input from speaker 116 and/or camera 108 of FIG. 1. For example, monitoring the pet to provide a behavioral assessment may include capturing images from camera 108 and comparing the captured images to stored images to determine the pet's state of mind using image matching and/or image comparison techniques, such as image key point detection, as described in reference to FIG. 3.

For example, monitoring the pet may include monitoring physical locations of the pet 406. In another embodiment, monitoring the pet may include monitoring the pet's state of mind. For example, monitoring the pet may include monitoring sounds made by the pet 407, behavior of the pet, pet expressions 408 and/or body movements of the pet 409, etc.

In block 410, at least one activity program from a plurality of activity programs may be selected dependent on the behavioral assessment of the pet. For example, the plurality of activity programs may include training commands, training obedience, and exercise activities. In one embodiment, the least one activity program may be selected further dependent on user input 411. For example, a user may select an activity program. In one embodiment, the least one activity program may be selected further dependent on a calendar 412 to schedule activity programs. For example, the least one activity program may be selected depending on an owner leave time, an owner return time, and/or when the owner is late. In another embodiment, the at least one activity program may be selected further dependent on a profile 413 of a pet. For example, if a profile of a pet indicates a propensity to be destructive, the at least one activity program may be selected to focus on disobedience training.

In block 415, the method may include aerially moving the unmanned aerial vehicle. For example, aerially moving the unmanned aerial vehicle may include movement in multiple degrees of freedom. In one embodiment, aerially moving the unmanned aerial vehicle may be based on the at least one activity program. It should be understood by one having ordinary skill in the art that aerially moving the unmanned aerial vehicle may be performed in previous and/or subsequent blocks. For example, aerially moving the unmanned aerial vehicle may be controlled during monitoring in block 405 and/or performing at least one function based on the at least one activity program in block 420.

In block 420, at least one function based on the at least one activity program is performed upon completion of the activity program. In one embodiment, the at least one function includes activating at least one of a plurality of feedback outputs. For example, performing at least one function may include at least one of dispensing a reward, providing a praise, providing a warning, and/or communicating with smart home appliances, or a combination thereof. For example, when the activity program includes training positive behavior, at least one function may include dispensing a reward 421 from the plurality of reward compartments 114 and/or providing a vocalized praise via speaker 116 of FIG. 1. In another example, when the activity program includes training negative behavior, performing at least one function may include providing behavior reinforcement 421, such as a vocalized warning and/or command, via speaker 116.

In another embodiment, performing at least one function may further include counting calories 422 of a food-related reward prior to and/or after dispensing a reward. For example, when a selected activity program has been completed and a reward is dispensed to the pet, the calories of the reward dispensed may be counted and/or recorded. In a further embodiment, the calories of a food-related reward may be calculated prior to dispensing the reward and, if the reward to be dispensed exceeds a target caloric intake parameter for the pet, the reward to be dispensed may be adjusted to a low-calorie reward. For example, adjusting the reward may include selecting a low-calorie reward instead of a high-calorie awarding dependent on the target caloric intake parameter for the pet. The target calorie intake parameter may represent a maximum amount of calories the pet should consume per day. Adjusting the reward to be dispensed may be performed so that a target caloric intake parameter is not exceeded.

In an embodiment, performing the at least one function may include communicating with at least one pet appliance 424 in a smart home. Various pet appliances (hereinafter referred to as "appliances") in a smart home may include, but are not limited to, a pet feeder, a pet door, a crate door, light controls, temperature controls, an activity device, a pet accessory, etc. For example, when an activity program has been selected, performing at least one function may include communicating with a pet feeder to dispense dietary needs, such as food, water, dietary supplements, etc.

In another embodiment, when an activity program has been selected, performing at least one function may include communicating with a pet door connected to the outside of a household and/or adjoining rooms to either open or close the pet door, as needed, to allow the pet to leave a particular location. In another embodiment, when a selected activity program has been selected, performing at least one function may include communicating with a crate door to either open or close the crate door, as needed, to allow the pet to leave the crate.

In yet another embodiment, when an activity program has been selected, performing at least one function may include communicating with a lighting and/or temperature controls of the household. For example, performing at least one function may include communicating with the lighting controls of the household to turn lights in the household on/off or dim the lights depending on the time of day/night and/or owner leave/return time. In another example, performing at least one function may include communicating with the temperature controls of the household to adjust the temperature conditions of the household.

In a further embodiment, when an activity program has been selected, performing at least one function may include communicating with an activity device to engage in activities with the pet. For example, an activity device may include, but is not limited to, a ball thrower, a cat toy, an exercise device, etc. In yet a further embodiment, performing at least one function may include communicating with a pet accessory. A pet accessory may include, but is not limited to, a collar worn by the pet. For example, when an activity program has been selected, performing at least one function may include communicating with the pet collar to direct a behavior reinforcement. It is to be appreciated that the various components and/or appliances described are merely illustrative and, thus, the present principles can be used with other components and/or appliances, while maintaining the scope of the present principles.

In a further embodiment, monitoring the pet to provide a behavioral assessment in block 405, selecting at least one activity program dependent on the behavioral assessment in block 415, and performing at least one function based on the activity program may be continuously repeated. For example, after an initial behavioral assessment has been provided and at least one function has been performed, such as dispending a reward and/or directing a behavior reinforcement, the pet may be monitored to provide a subsequent behavioral assessment.

Having described preferred embodiments of an unmanned aerial vehicle for interacting with a pet (which are intended to be illustrative and not limiting), it is noted that modifications and variations can be made by persons skilled in the art in light of the above teachings. It is therefore to be understood that changes may be made in the particular embodiments disclosed which are within the scope of the invention as outlined by the appended claims. Having thus described aspects of the invention, with the details and particularity required by the patent laws, what is claimed and desired protected by Letters Patent is set forth in the appended claims.

What is claimed is:

1. An unmanned aerial vehicle for interacting with a pet, the unmanned aerial vehicle comprising:
   a processor-based monitoring device to provide a behavioral assessment of the pet;
   an activity recommender to select at least one activity program dependent on the behavioral assessment;
   at least one motor mounted on the unmanned aerial vehicle to provide aerial movement based on the at least one activity program; and
   an activity coordinator to perform at least one function based on the at least one activity program, wherein the at least one function includes activating at least one of a plurality of feedback outputs upon completion of the activity program.

2. The unmanned aerial vehicle of claim 1, wherein the processor-based monitoring device monitors at least one of a pet location, sounds generated by the pet, expressions generated by the pet, movement of the pet, and nearness of the pet to safety hazards.

3. The unmanned aerial vehicle of claim 1, wherein the at least one function includes dispensing a reward from a plurality of reward compartments.

4. The unmanned aerial vehicle of claim 3, further comprising a calorie counter to count calories of the reward and adjust the reward based on a total caloric intake parameter.

5. The unmanned aerial vehicle of claim 1, wherein the at least one function includes behavior reinforcement to the pet.

6. The unmanned aerial vehicle of claim 1, further comprising a steering controller to control the aerial movement of the unmanned aerial vehicle in multiple degrees of freedom.

7. The unmanned aerial vehicle of claim 1, further comprising a scheduler to provide a calendar to the activity recommender to schedule the at least one activity program.

8. The unmanned aerial vehicle of claim 1, further comprising an appliance communicator to communicate with at least one pet appliance.

9. The unmanned aerial vehicle of claim 8, wherein the at least one function includes communicating with the at least one pet appliance.

10. The unmanned aerial vehicle of claim 1, further comprising a profiler to store information regarding a profile of the pet, wherein the profile includes at least one of a pet breed, pet type, pet capacity to cause damage, and pet capacity to self-injure.

11. A method for interacting with a pet using an unmanned aerial vehicle, the method comprising:
    monitoring, by a processor-based monitoring device, the pet to provide a behavioral assessment of the pet;
    selecting at least one activity program dependent on the behavioral assessment;
    aerially moving the unmanned aerial vehicle system based on the at least one activity program; and
    performing at least one function based on the at least one activity program, wherein the at least one function includes activating at least one of a plurality of feedback outputs upon completion of the activity program.

12. The method of claim 11, wherein monitoring includes monitoring at least one of a pet location, sounds generated by the pet, expressions generated by the pet, movement of the pet, and nearness of the pet to safety hazards.

13. The method of claim 11, wherein at least one function includes dispensing a reward from a plurality of reward compartments.

14. The method of claim 13, wherein at least one function includes counting calories of the reward and adjusting the reward based on a total caloric intake parameter.

15. The method of claim 11, wherein at least one function includes behavior reinforcement to the pet.

16. The method of claim 11, wherein monitoring includes controlling the aerial movement of the unmanned aerial vehicle in multiple degrees of freedom.

17. The method of claim 11, wherein at least one function includes communicating with the at least one pet appliance.

18. A non-transitory computer readable storage medium comprising a computer readable program for interacting with a pet using an unmanned aerial vehicle, wherein the computer readable program, when executed on a computer, causes the computer to execute:
    monitoring, by a processor-based monitoring device, the pet to provide a behavioral assessment of the pet;
    selecting at least one activity program dependent on the behavioral assessment;
    controlling, using control signals, aerial movement of an unmanned aerial vehicle based on the at least one activity program; and
    performing at least one function based on the at least one activity program, wherein the at least one function includes activating at least one of a plurality of feedback outputs upon completion of the activity program.

19. The non-transitory computer readable storage medium of claim 18, wherein monitoring includes monitoring at least one of a pet location, sounds generated by the pet, expressions generated by the pet, movement of the pet, and nearness of the pet to safety hazards.

20. The non-transitory computer readable storage medium of claim 18, wherein the at least one function includes dispensing a reward from a plurality of reward compartments.

* * * * *